(12) United States Patent
Wisnovsky (10) Patent No.: US 9,830,385 B2
(45) Date of Patent: Nov. 28, 2017

(54) METHODS AND APPARATUS FOR PARTITIONING DATA

(71) Applicant: salesforce.com, inc., San Francisco, CA (US)

(72) Inventor: Peter Wisnovsky, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 156 days.

(21) Appl. No.: 14/017,515

(22) Filed: Sep. 4, 2013

(65) Prior Publication Data

US 2014/0067810 A1 Mar. 6, 2014

Related U.S. Application Data

(60) Provisional application No. 61/696,587, filed on Sep. 4, 2012.

(51) Int. Cl.
*G06F 17/30* (2006.01)

(52) U.S. Cl.
CPC .. *G06F 17/30705* (2013.01); *G06F 17/30584* (2013.01)

(58) Field of Classification Search
CPC ......... G06F 17/30584; G06F 17/30312; G06F 17/30321; Y10S 707/99943; Y10S 707/968
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |

(Continued)

FOREIGN PATENT DOCUMENTS

IN 2495673 A1 * 9/2012 ............ G06Q 10/06

*Primary Examiner* — Augustine K Obisesan
(74) *Attorney, Agent, or Firm* — Lorenz & Kopf LLP (57) ABSTRACT

A method for data partitioning method includes defining a set of category levels associated with a plurality of entities stored within a first database, wherein the set of category levels is hierarchical (e.g., proceeding from higher to lower levels). Each of the plurality of entities is assigned to a category level within the set of category levels. One or more partition keys are defined for at least one of the category levels. The plurality of entities are then copied to a second database based on the set of category levels and the one or more partition keys.

16 Claims, 3 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,412,455 B2 | 8/2008 | Dillon |
| 7,620,655 B2 | 11/2009 | Larsson et al. |
| 7,698,160 B2 | 4/2010 | Beaven et al. |
| 7,899,780 B1* | 3/2011 | Shmuylovich et al. ...... 707/610 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,150,870 B1* | 4/2012 | Peddy et al. ............ 707/770 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0087510 A1* | 7/2002 | Weinberg et al. ............ 707/1 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0131919 A1* | 6/2005 | Brookler et al. ............ 707/100 |
| 2007/0078828 A1* | 4/2007 | Parikh et al. ............... 707/3 |
| 2007/0156392 A1* | 7/2007 | Balchandran et al. ......... 704/9 |
| 2007/0156901 A1* | 7/2007 | Becker ............ G06F 17/30528 709/226 |
| 2008/0046454 A1* | 2/2008 | Basu et al. ............ 707/101 |
| 2008/0091690 A1* | 4/2008 | Ellersick et al. ............ 707/100 |
| 2008/0162622 A1* | 7/2008 | Becker ............ G06F 17/30557 709/201 |
| 2008/0249972 A1 | 10/2008 | Dillon |
| 2009/0063414 A1 | 3/2009 | White et al. |
| 2009/0094235 A1* | 4/2009 | White et al. ............ 707/5 |
| 2009/0164790 A1* | 6/2009 | Pogodin ............ G06F 21/64 713/176 |
| 2010/0030995 A1* | 2/2010 | Wang ............ G06F 17/30339 711/173 |
| 2010/0057804 A1* | 3/2010 | Nakano ............ 707/737 |
| 2010/0106734 A1* | 4/2010 | Calder et al. ............ 707/758 |
| 2010/0115246 A1* | 5/2010 | Seshadri et al. ............ 712/225 |
| 2010/0281027 A1* | 11/2010 | Duan ............ G06F 17/30584 707/737 |
| 2011/0138027 A1* | 6/2011 | Friedmann ............ G06F 9/52 709/223 |
| 2011/0213789 A1* | 9/2011 | Doshi ............ G06F 21/6218 707/754 |
| 2011/0213870 A1* | 9/2011 | Cai ............ H04L 67/10 709/223 |
| 2011/0307450 A1* | 12/2011 | Hahn ............ G06F 17/30339 707/649 |
| 2012/0109947 A1* | 5/2012 | Yu ............ G06F 17/30584 707/725 |
| 2012/0173581 A1* | 7/2012 | Hartig ............ G06F 21/52 707/781 |
| 2013/0060825 A1* | 3/2013 | Farcasiu et al. ............ 707/812 |
| 2013/0159659 A1* | 6/2013 | Gelman ............ G06F 17/30584 711/173 |
| 2013/0166606 A1* | 6/2013 | Fricke ............ G06F 17/30584 707/803 |
| 2014/0032228 A1* | 1/2014 | Johri ............ G06F 21/6227 705/1.1 |

* cited by examiner

FIG. 3

METHODS AND APPARATUS FOR PARTITIONING DATA

CROSS-REFERENCE TO RELATED APPLICATION(S)

This application claims the benefit of U.S. provisional patent application Ser. No. 61/696,587, filed Sep. 4, 2012, the entire contents of which are incorporated by reference herein.

TECHNICAL FIELD

Embodiments of the subject matter described herein relate generally to computer systems, and more particularly, embodiments of the subject matter relate to methods and systems for partitioning data in a networked environment.

BACKGROUND

Organizations are increasing employing very large database systems, such as multi-tenant systems, in connection with their enterprise operations. In many contexts it is often desirable to partition all or a portion of such databases into a second or "sandbox" database for testing and maintenance purposes and to provide a relatively small database maintenance window.

Prior art methods for copying data in the context of application change management typically involve making copies of the entire database, which in a multitenant system requires copying an organization's entire table data row by row without any opportunity to partition data between that which should be copied and that which should not. As a result, the selected data is often unnecessarily large. Maintaining the capacity to store the copied data can result in an enormous cost to the enterprise. Furthermore, the fact that so much data is being copied means that the user will typically be required to wait a long time for the copy to complete, and the time window for doing the copy is large enough that significant inconsistencies may be introduced into the data.

Accordingly, there is a need for improved methods for managing and partitioning data in a manner that is fast, easily manageable, high data-availability for critical data.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for partitioning database entities utilizing defined categorization levels and associated partition keys. Through the use of such categorization levels—which generally increase in both data volatility and data volume as the levels are traversed from bottom to top—the segmentation of large blocks of data can be performed more efficiently and in a way that is intuitive to those familiar with business level schemas (i.e., without requiring detailed computer science or database design knowledge).

Figure 1:
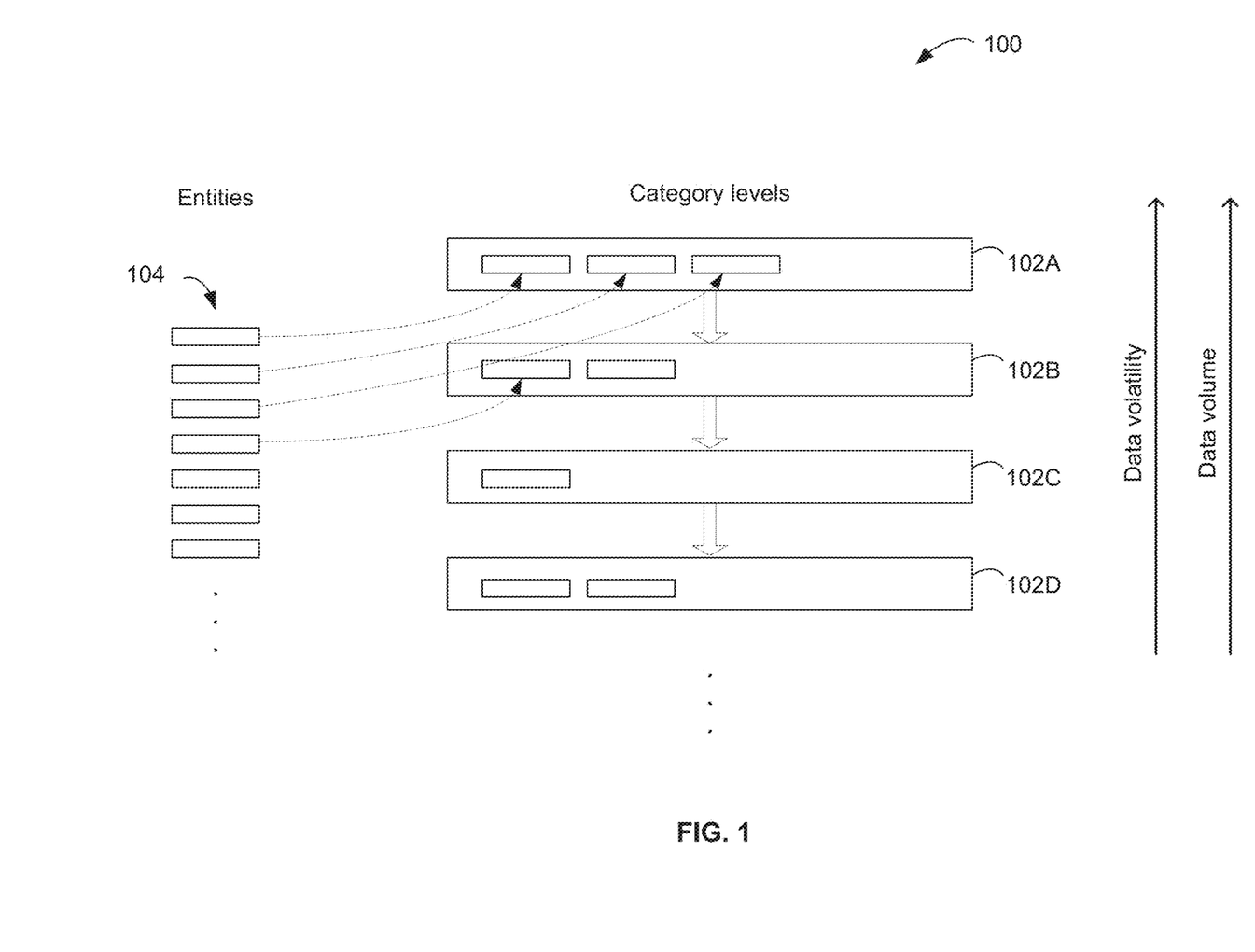
FIG. 1 is a conceptual block diagram depicting a data partitioning scheme in accordance with various embodiments.
Figure 2:
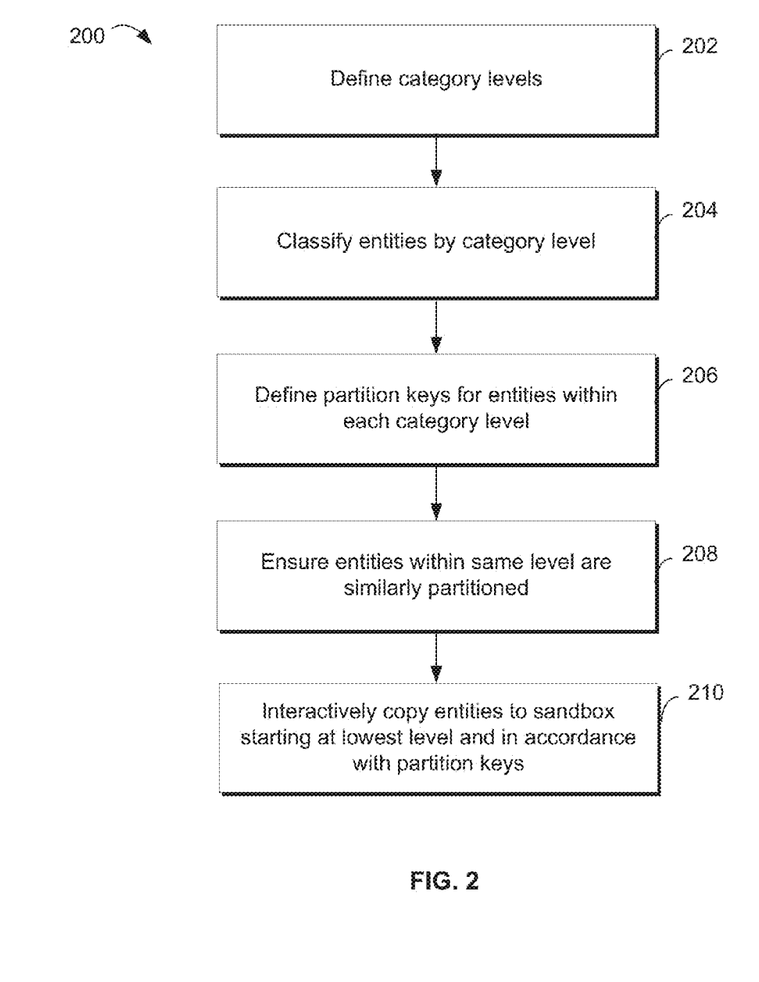
FIG. 2 is a conceptual block diagram depicting an exemplary data partitioning method in accordance with various embodiments.

FIG. 1 is a conceptual block diagram depicting a data partitioning scheme 100 in accordance with various embodiments, and FIG. 2 is a an exemplary method 200 describing a method of data partitioning in accordance with the diagram of FIG. 1. These two figures will be used in conjunction with each other to describe an example partitioning method.

Initially, in step 202, one or more category levels (or "partition levels," or simply "levels") 102 (102A, 102B, etc.) are defined with respect to a plurality of "entities" 104 stored within a database. In this regard, the term "entity" as used herein refers to a database "object", a schema or set of schemas, or the like, and corresponds to some logical and/or physical portion of the database. Such entities might include, for example, a list of corporate offices, an employee database, a set of sales transactions, etc. The invention is not so limited however, and can be applied to wide range of database entities. As will be discussed below, such entities might exist with a multi-tenant database system.

In accordance with the illustrated embodiment, the set of category levels is hierarchical. That is, entities within a first, higher category level may only depend only upon entities within a lower, second level (and not entities within a higher level). For example, level 102D might include entities 104 detailing the location of offices (address, city, state, etc.), financial codes, organization structure, and the like, while level 102C might include entities 104 corresponding to employees working in those offices. In such a case, the entities within category 102C will depend upon the entities within category 102D, but the converse will not be true.

As depicted in FIG. 1, it is desirable that levels 102 generally increase in data volatility from lower to higher levels. That is, it is preferable that lower levels such as level 102D include entities that do not often change (such as zip code definitions, office locations, and the like), while higher levels (such as 102A) include entities that are known to change and be updated rather quickly (such as daily financial transactions and the like). Similarly, it is desirable that the upper levels exhibit higher data volumes when compared to lower levels. For example, it will be apparent that zip code data (e.g., at level 102D) will include a far less volume of data when compared to daily financial transactions.

The definition of levels 102 may be performed in a variety of ways. In one embodiment, for example, a standard set of default levels (e.g., a template including about five levels) is provided to the user. These levels may be edited by the user (e.g., through a suitable graphical user interface) to add, delete, insert, rename, and/or redefine a set of levels that are most appropriate for the given application. Alternatively, the user may create a set of levels starting with no default defined levels. In an alternate embodiment, a turn-key set of levels might be provided for a user based on that user's suite of applications.

In step 204, the plurality of entities 104 is assigned to or classified within a category level 102 within the set of category levels. This may be performed manually by the user, performed automatically, or any combination thereof. In one embodiment, assigning each of the plurality of entities to a category level is performed iteratively based on a relationship between the entities in each level and user interaction provided via a user interface.

In step 206, one or more partition keys are defined for at least one of the category levels. These partition keys will generally relate to keys that a user would typically use to filter or select data within that entity, and will depend upon the nature of that entity. For example, the partition key might relate to a geographical region, a product type, an employee code, or the like.

In step 208, entities 104 within the same level 102 are similarly partitioned. That is, for any category level 102 having a partition key defined, all entities 104 within that category level are partitioned in accordance with the same partition key. For example, if one entity 104 within level 102A includes a partition key corresponding to "business unit," the system ensures that all other entities 104 within level 102A are also similarly partitionable.

Finally, in step 210, the plurality of entities are copied to a second database or "sandbox" based on the set of category levels and the one or more partition keys. The system might perform a validation step prior to copying to ensure that the hierarchical layering model is not violated (e.g., by an entity in a lower level depending upon an entity in a higher level.) In one embodiment, copying the plurality of entities includes beginning the copying at the lowest level of the hierarchical set of category levels (e.g. 102D) and proceeding upward within the set of category levels to the top level (e.g., 102A). For lower levels, which will tend to exhibit lower data volumes and volatility, it will generally be appropriate to copy all entities within that level (rather than utilizing some form of partition key). In such cases, all levels below that level should also be fully copied. That is, if level 102C is to be copied fully, then levels 102D and 102E will likewise be fully copied. The threshold level at which this full copy occurs may be user specified or configured by an administrator.

For levels above the full-copy threshold, the partition keys for that level are used to perform a partial copy. That is, assuming that level 102B is partitioned by "business unit," then the user will be required to enter a particular business unit or units, and only those portions of the entities within level 102B are copied.

The data partitioning method described herein may be implemented in accordance with a variety of known data models. Toward that end, a series of tables illustrating just one such data model will now be described. Each includes a list of attributes (with sample names), a data type, and a description of that attribute. It will be appreciated that the invention is not so limited, however.

The Partition level scheme is a top-level, unmanageable developer-named entity as follows:

| Attribute | Type | Description |
| --- | --- | --- |
| DeveloperName | String | DeveloperName |

Partition level is a packageable, child-level, unmanageable labelled entity:

| Attribute | Type | Description |
| --- | --- | --- |
| Partition Level Scheme ID | ID | Partition Level Scheme |
| Level | number | Level Number |
| Label | String | Level Name |

Partition level member is also a packagable, child, unmanageable entity:

| Attribute | Type | Description |
| --- | --- | --- |
| Partition Level Scheme ID | ID | Partition Level Scheme |
| Partition Level ID | ID | Level ID |
| Entity | ID | Entity |

Partition key is a packageble, child, unmanageable labelled entity:

| Attribute | Type | Description |
| --- | --- | --- |
| Partition Level Scheme ID | ID | Partition Level Scheme |
| Starting Partition Level ID | ID | First level to which this key applies |
| Entity | ID | Entity |
| KeyType | EnumOrID | Field type or custom setting ID |
| Label | String | Label |

Partition key field is a packageable, child, unmanageable entity:

| Attribute | Type | Description |
| --- | --- | --- |
| Partition Level Scheme ID | ID | Partition Level Scheme |
| Partition Key ID | ID | Key ID |
| Entity | ID | Entity |
| Field | ID | Field |

The Derived Partition key relationship is a packageable, child, unmanageable entity:

| Attribute | Type | Description |
| --- | --- | --- |
| Partition Level Scheme ID | ID | Partition Level Scheme |
| Partition Key ID | ID | Key ID |
| Entity | ID | Entity |
| Field | ID | Field of entity that serves as the master to filter these entities on. |

Sandbox Custom Copy Level is an unpackageable, child entity:

| Attribute | Type | Description |
| --- | --- | --- |
| Partition Level Scheme ID | ID | Partition Level Scheme |
| Sandbox ID | ID | ID of sandbox |

And the Sandbox Custom Copy Key Value is also an unpackagable, child entity:

| Attribute | Type | Description |
| --- | --- | --- |
| Partition Level Scheme ID | ID | Partition Level Scheme |
| Partition Key ID | ID | Key ID |
| Value | String | Value to apply to the specified key |

As mentioned above, the data partitioning method depicted in FIGS. 1 and 2 may be implemented in the context of, for example, a multi-tenant system. In that regard, FIG. 3 presents a conceptual block diagram of an exemplary multi-tenant system suitable for implementation of the data partitioning methods described above.

Figure 3:
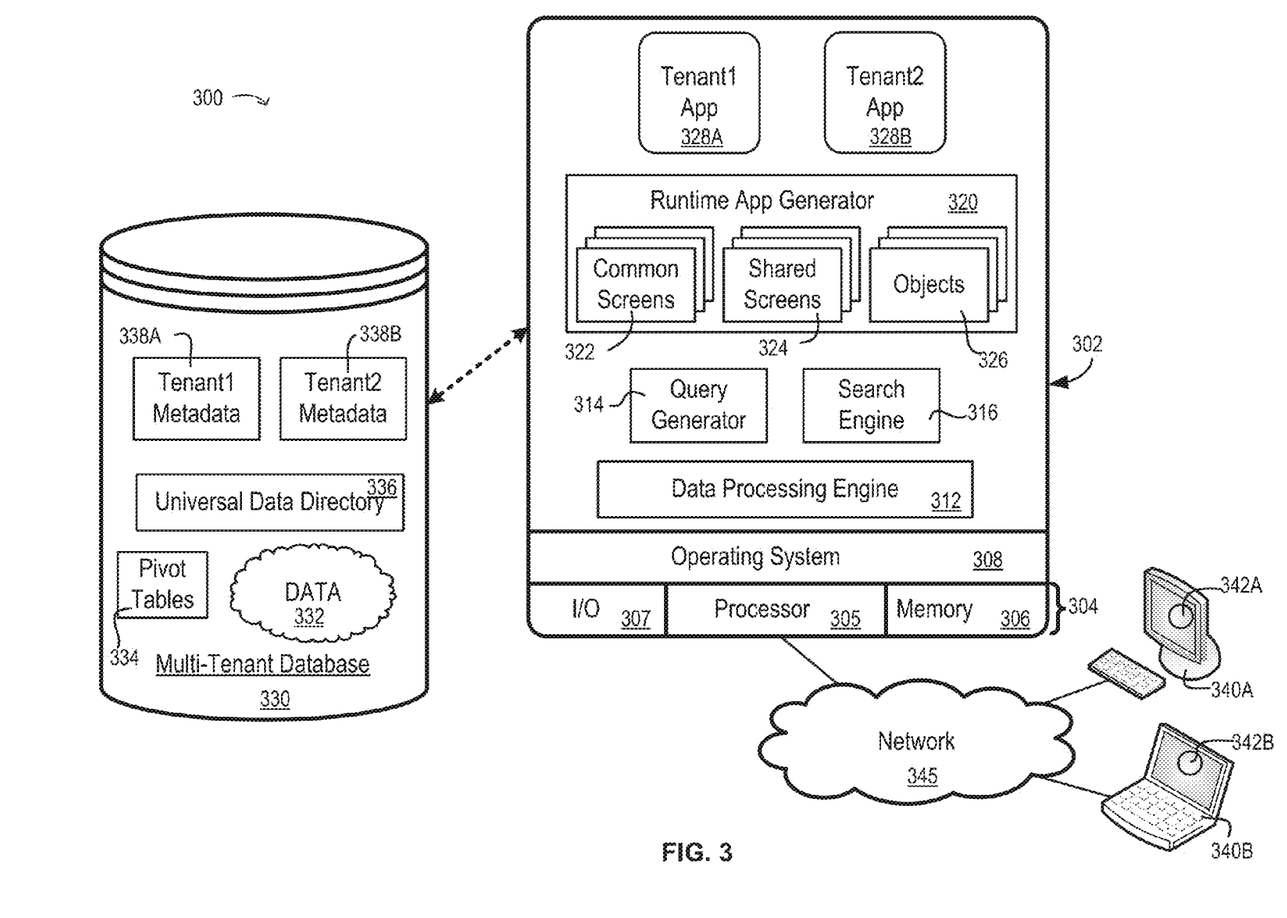
FIG. 3 is a block diagram of an exemplary multi-tenant system in accordance with one or more embodiments.

In general, the illustrated multi-tenant system 300 of FIG. 3 includes a server 302 that dynamically creates and supports virtual applications 328 based upon data 332 from a common database 330 that is shared between multiple tenants, alternatively referred to herein as a multi-tenant database. Data and services generated by the virtual applications 328 are provided via a network 345 to any number of client devices 340, as desired. Each virtual application 328 is suitably generated at run-time (or on-demand) using a common application platform 510 that securely provides access to the data 332 in the database 330 for each of the various tenants subscribing to the multi-tenant system 300. In accordance with one non-limiting example, the multi-tenant system 300 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 330. In this regard, each tenant includes one or more users associated with, assigned to, or otherwise belonging to that respective tenant. Stated another way, each respective user within the multi-tenant system 300 is associated with, assigned to, or otherwise belongs to a particular tenant of the plurality of tenants supported by the multi-tenant system 300. Tenants may represent customers, customer departments, business or legal organizations, and/or any other entities that maintain data for particular sets of users within the multi-tenant system 300. Although multiple tenants may share access to the server 302 and the database 330, the particular data and services provided from the server 302 to each tenant can be securely isolated from those provided to other tenants. The multi-tenant architecture therefore allows different sets of users to share functionality and hardware resources without necessarily sharing any of the data 332 belonging to or otherwise associated with other tenants.

The multi-tenant database 330 is any sort of repository or other data storage system capable of storing and managing the data 332 associated with any number of tenants. The database 330 may be implemented using any type of conventional database server hardware. In various embodiments, the database 330 shares processing hardware 304 with the server 302. In other embodiments, the database 330 is implemented using separate physical and/or virtual database server hardware that communicates with the server 302 to perform the various functions described herein. In an exemplary embodiment, the database 330 includes a database management system or other equivalent software capable of determining an optimal query plan for retrieving and providing a particular subset of the data 332 to an instance of virtual application 328 in response to a query initiated or otherwise provided by a virtual application 328. The multi-tenant database 330 may alternatively be referred to herein as an on-demand database, in that the multi-tenant database 330 provides (or is available to provide) data at run-time to on-demand virtual applications 328 generated by the application platform 310.

In practice, the data 332 may be organized and formatted in any manner to support the application platform 510. In various embodiments, the data 332 is suitably organized into a relatively small number of large data tables to maintain a semi-amorphous "heap"-type format. The data 332 can then be organized as needed for a particular virtual application 328. In various embodiments, conventional data relationships are established using any number of pivot tables 334 that establish indexing, uniqueness, relationships between entities, and/or other aspects of conventional database organization as desired. Further data manipulation and report formatting is generally performed at run-time using a variety of metadata constructs. Metadata within a universal data directory (UDD) 336, for example, can be used to describe any number of forms, reports, workflows, user access privileges, business logic and other constructs that are common to multiple tenants. Tenant-specific formatting, functions and other constructs may be maintained as tenant-specific metadata 338 for each tenant, as desired. Rather than forcing the data 332 into an inflexible global structure that is common to all tenants and applications, the database 330 is organized to be relatively amorphous, with the pivot tables 334 and the metadata 338 providing additional structure on an as-needed basis. To that end, the application platform 510 suitably uses the pivot tables 334 and/or the metadata 338 to generate "virtual" components of the virtual applications 328 to logically obtain, process, and present the relatively amorphous data 332 from the database 330.

The server 302 is implemented using one or more actual and/or virtual computing systems that collectively provide the dynamic application platform 510 for generating the virtual applications 328. For example, the server 302 may be implemented using a cluster of actual and/or virtual servers operating in conjunction with each other, typically in association with conventional network communications, cluster management, load balancing and other features as appropriate. The server 302 operates with any sort of conventional processing hardware 304, such as a processor 305, memory 306, input/output features 307 and the like. The input/output features 307 generally represent the interface(s) to networks (e.g., to the network 345, or any other local area, wide area or other network), mass storage, display devices, data entry devices and/or the like. The processor 305 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 306 represents any non-transitory short or long term storage or other computer-readable media capable of storing programming instructions for execution on the processor 305, including any sort of random access memory (RAM), read only memory (ROM), flash memory, magnetic or optical mass storage, and/or the like. The computer-executable programming instructions, when read and executed by the server 302 and/or processor 305, cause the server 302 and/or processor 305 to create, generate, or otherwise facilitate the application platform 510 and/or virtual applications 328 and perform one or more additional tasks, operations, functions, and/or processes described herein. It should be noted that the memory 306 represents one suitable implementation of such computer-readable media, and alternatively or additionally, the server 302 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 328 that provide data and/or services to the client devices 340. In a typical embodiment, the application platform 510 gains access to processing resources, communications interfaces and other features of the processing hardware 304 using any sort of conventional or proprietary operating system 308. The virtual applications 328 are typically generated at run-time in response to input received from the client devices 340. For the illustrated embodiment, the application platform 510 includes a bulk data processing engine 312, a query generator 314, a search engine 316 that provides text indexing and other search functionality, and a runtime application generator 320. Each of these features may be implemented as a separate process or other module, and many equivalent embodiments could include different and/or additional features, components or other modules as desired.

The runtime application generator 320 dynamically builds and executes the virtual applications 328 in response to specific requests received from the client devices 340. The virtual applications 328 are typically constructed in accordance with the tenant-specific metadata 338, which describes the particular tables, reports, interfaces and/or other features of the particular application 328. In various embodiments, each virtual application 328 generates dynamic web content that can be served to a browser or other client program 342 associated with its client device 340, as appropriate.

The runtime application generator 320 suitably interacts with the query generator 314 to efficiently obtain multi-tenant data 332 from the database 330 as needed in response to input queries initiated or otherwise provided by users of the client devices 340. In a typical embodiment, the query generator 314 considers the identity of the user requesting a particular function (along with the user's associated tenant), and then builds and executes queries to the database 330 using system-wide metadata 336, tenant specific metadata 338, pivot tables 334, and/or any other available resources. The query generator 314 in this example therefore maintains security of the common database 330 by ensuring that queries are consistent with access privileges granted to the user and/or tenant that initiated the request. In this manner, the query generator 314 suitably obtains requested subsets of data 332 accessible to a user and/or tenant from the database 330 as needed to populate the tables, reports or other features of the particular virtual application 328 for that user and/or tenant.

With continued reference to FIG. 3, the data processing engine 312 performs bulk processing operations on the data 332 such as uploads or downloads, updates, online transaction processing, and/or the like. In some embodiments, data processing engine 312 performs the data partitioning tasks described above. That is, data processing engine 312 might include a data partitioning module configured to perform one or more of those tasks. In many embodiments, less urgent bulk processing of the data 332 can be scheduled to occur as processing resources become available, thereby giving priority to more urgent data processing by the query generator 314, the search engine 316, the virtual applications 328, etc.

In exemplary embodiments, the application platform 510 is utilized to create and/or generate data-driven virtual applications 328 for the tenants that they support. Such virtual applications 328 may make use of interface features such as custom (or tenant-specific) screens 324, standard (or universal) screens 322 or the like. Any number of custom and/or standard objects 326 may also be available for integration into tenant-developed virtual applications 328. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 332 associated with each virtual application 328 is provided to the database 330, as appropriate, and stored until it is requested or is otherwise needed, along with the metadata 338 that describes the particular features (e.g., reports, tables, functions, objects, fields, formulas, code, etc.) of that particular virtual application 328. For example, a virtual application 328 may include a number of objects 326 accessible to a tenant, wherein for each object 326 accessible to the tenant, information pertaining to its object type along with values for various fields associated with that respective object type are maintained as metadata 338 in the database 330. In this regard, the object type defines the structure (e.g., the formatting, functions and other constructs) of each respective object 326 and the various fields associated therewith.

With continued reference to FIG. 3, the data and services provided by the server 302 can be retrieved using any sort of personal computer, mobile telephone, tablet or other network-enabled client device 340 on the network 345. In an exemplary embodiment, the client device 340 includes a display device, such as a monitor, screen, or another conventional electronic display capable of graphically presenting data and/or information retrieved from the multi-tenant database 330. Typically, the user operates a conventional browser application or other client program 342 executed by the client device 340 to contact the server 302 via the network 345 using a networking protocol, such as the hypertext transport protocol (HTTP) or the like. The user typically authenticates his or her identity to the server 302 to obtain a session identifier ("SessionID") that identifies the user in subsequent communications with the server 302. When the identified user requests access to a virtual application 328, the runtime application generator 320 suitably creates the application at run time based upon the metadata 338, as appropriate. As noted above, the virtual application 328 may contain Java, ActiveX, or other content that can be presented using conventional client software running on the client device 340; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to databases, social networks, user interfaces, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A data partitioning method performed by a data partitioning module executed at a server to partition data for a particular tenant of a first multitenant database of a multitenant system for a plurality of tenants, wherein the first multitenant database is configured to store data for the plurality of tenants in a table, the method comprising:

defining, via the data partitioning module in response to first inputs from a computer associated with the particular tenant, a set of category levels associated with a plurality of entities stored within the table of the first multitenant database, wherein each entity corresponds to a logical portion within the table of the first multitenant database, wherein the set of category levels is hierarchical in that entities within a first, higher category level depend only upon entities within a lower, second category level;

assigning, via the data partitioning module in response to second inputs from the computer associated with the particular tenant, each of the plurality of entities to one of the category levels within the set of category levels;

defining, via the data partitioning module in response to third inputs from the computer associated with the particular tenant, one or more partition keys for each of the category levels;

selecting one of the partition keys and a specific instance of the selected partition key; and copying, via the data partitioning module based on the set of category levels and the selected partition key, all entities corresponding to the specific instance of the selected partition key from the category level for which the selected partition key is defined and all entities in a lower category level from the first multitenant database to a second database to partition part of the data for the particular tenant according to the set of category levels and the selected partition key.

2. The method of claim 1, wherein assigning each of the plurality of entities to a category level is performed iteratively based on a relationship between the entities in each level and user interaction provided via a user interface.

3. The method of claim 1, wherein, for any category level having the partition key defined, all entities within that category level are partitioned in accordance with the same partition key.

4. The method of claim 1, further including validating the set of category levels, the entities, and the partition keys prior to copying the plurality of entities.

5. The method of claim 1, wherein copying the plurality of entities includes beginning the copying at the lowest level of the hierarchical set of category levels and proceeding upward within the set of category levels.

6. The method of claim 1, further including prompting a user to enter information associated with the one or more partition keys while proceeding upward within the set of category levels.

7. A non-transitory computer-readable medium comprising computer-executable instructions that, when executed by a processing system of a server, cause the processing system to:

define, in response to first inputs from a computer associated with the particular tenant, a set of category levels associated with a plurality of entities stored within a first multitenant database of a multitenant system that is configured to store data for the plurality of tenants in a table, wherein data for a particular tenant is stored in the table as the plurality of entities, wherein each entity corresponds to a logical portion within the table of the first database, wherein the set of category levels is hierarchical in that entities within a first, higher category level depend only upon entities within a lower, second category level;

assign, in response to second inputs from the computer associated with the particular tenant, each of the plurality of entities to one of the category levels within the set of category levels;

define, in response to third inputs from the computer associated with the particular tenant, one or more partition keys for each of the category levels;

select one of the partition keys and a specific instance of the selected partition key; and copy, based on the set of category levels and the selected partition key, all entities corresponding to the specific instance of the selected partition key from the category level for which the selected partition key is defined and all entities in a lower category level from the first multitenant database to a second database to partition part of the data for the particular tenant according to the set of category levels and the selected partition key.

8. The non-transitory computer-readable medium of claim 7, wherein copying the category level is performed iteratively based on a relationship between the entities in each level and user interaction provided via a user interface.

9. The non-transitory computer-readable medium of claim 7, wherein, for any category level having the partition key defined, all entities within that category level are partitioned in accordance with the same partition key.

10. The non-transitory computer-readable medium of claim 7, further including validating the set of category levels, the entities, and the partition keys prior to copying the plurality of entities.

11. A multitenant system for data partitioning, comprising:
a computer associated with a particular tenant;
a first multitenant database configured to store data for a plurality of tenants in a table, wherein data for the particular tenant is stored in the table as a plurality of entities, wherein each entity corresponds to a logical portion within the table of the first multitenant database;
a server communicatively coupled to the first multitenant database, comprising:
a processor configured to execute a data partitioning module to partition the data for the particular tenant, wherein the data partitioning module is configured to:

define, in response to first inputs from the computer associated with the particular tenant, a set of category levels associated with the plurality of entities stored within the first multitenant database, wherein the set of category levels is hierarchical in that entities within a first, higher category level depend only upon entities within a lower, second category level, assign, in response to second inputs from the computer associated with the particular tenant, each of the plurality of entities to one of the category levels within the set of category levels, define, in response to third inputs from the computer associated with the particular tenant, one or more partition keys for each of the category levels, select one of the partition keys and a specific instance of the selected partition key; and copy, based on the set of category levels and the selected partition key, all entities corresponding to the specific instance of the selected partition key from the category level for which the selected partition key is defined and all entities in a lower category level from the first multitenant database to a second database to partition part of the data for the particular tenant according to the set of category levels and the selected partition key.

12. The system of claim 11, wherein the data partitioning module is configured to assign each of the plurality of entities to a category level iteratively and based on a relationship between the entities in each level and user interaction provided via a user interface.

13. The system of claim 11, wherein, for any category level having the partition key defined, all entities within that category level are partitioned in accordance with the same partition key.

14. The system of claim 11, further including validating the set of category levels, the entities, and the partition keys prior to copying the plurality of entities.

15. The system of claim 11, wherein the data partitioning module is configured to copy the plurality of entities includes beginning the copying at the lowest level of the hierarchical set of category levels and proceeding upward within the set of category levels.

16. The system of claim 11, wherein the data partitioning module is configured to prompt a user to enter information associated with the one or more partition keys while proceeding upward within the set of category levels.

* * * * *